(12) United States Patent
Awad et al.

(10) Patent No.: US 8,341,428 B2
(45) Date of Patent: Dec. 25, 2012

(54) SYSTEM AND METHOD TO PROTECT COMPUTING SYSTEMS

(75) Inventors: Elie Awad, Essex Junction, VT (US); Mariette Awad, Essex Junction, VT (US); Adam E. Trojanowski, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 11/767,545

(22) Filed: Jun. 25, 2007

(65) Prior Publication Data
US 2008/0320313 A1    Dec. 25, 2008

(51) Int. Cl.
*G06F 21/00* (2006.01)

(52) U.S. Cl. .......... 713/193; 726/24; 713/187; 713/188; 713/192; 707/697; 707/698; 707/699

(58) Field of Classification Search ...................... 726/24
See application file for complete search history.

(56) References Cited

U.S. PATENT DOCUMENTS

| | | | |
|---|---|---|---|
| 5,960,170 A | 9/1999 | Chen et al. | |
| 5,966,732 A | 10/1999 | Assaf | |
| 6,029,256 A | 2/2000 | Kouznetsov | |
| 6,347,375 B1 * | 2/2002 | Reinert et al. .................. | 726/24 |
| 6,728,886 B1 | 4/2004 | Ji et al. | |
| 6,735,700 B1 * | 5/2004 | Flint et al. ....................... | 726/24 |
| 6,802,028 B1 * | 10/2004 | Ruff et al. ....................... | 714/38 |
| 6,907,524 B1 | 6/2005 | Huntington, II et al. | |
| 6,928,555 B1 * | 8/2005 | Drew .............................. | 726/24 |
| 6,931,570 B2 | 8/2005 | Peikari | |
| 6,952,776 B1 | 10/2005 | Chess | |
| 7,036,147 B1 | 4/2006 | Hursey | |
| 7,058,810 B2 | 6/2006 | Kumazawa et al. | |
| 7,058,975 B2 * | 6/2006 | Edwards et al. ................. | 726/22 |
| 7,069,594 B1 | 6/2006 | Bolin | |
| 7,103,913 B2 | 9/2006 | Arnold et al. | |
| 7,216,366 B1 | 5/2007 | Raz et al. | |
| 7,627,758 B1 * | 12/2009 | Tock et al. ..................... | 713/168 |
| 7,739,738 B1 | 6/2010 | Sobel et al. | |
| 7,752,667 B2 | 7/2010 | Challener et al. | |
| 2004/0117401 A1 * | 6/2004 | Miyata et al. ............... | 707/104.1 |
| 2004/0153718 A1 * | 8/2004 | Shen et al. ......................... | 714/5 |

(Continued)

OTHER PUBLICATIONS

Boja et al., "Optimization of Antivirus Software", 2007, pp. 99-102.*
Office Action from U.S. Appl. No. 11/873,754 dated Sep. 21, 2010.
Final Office Action dated Feb. 15, 2011 in U.S. Appl. No. 11/873,754.

*Primary Examiner* — Taghi Arani
*Assistant Examiner* — Thaddeus Plecha
(74) *Attorney, Agent, or Firm* — David Cain; Roberts Mlotkowski Safran & Cole, P.C.

(57) ABSTRACT

A system and method for protecting computing systems, and more particularly a system and method which a dedicated hardware component configured to communicate with a protection program. A computer hardware subsystem includes a memory comprising content. The content is at least a list of files which have been modified within a predetermined period of time. The list of files is a subset of files of a hard drive. A dedicated hardware component is configured to track the files which have been modified and provide a location of the files to the memory. A communication link between the dedicated hardware component and a protection program provides the protection program with the subset of files of the hard drive as referenced by the memory content.

25 Claims, 7 Drawing Sheets

U.S. PATENT DOCUMENTS

| | | |
|---|---|---|
| 2005/0204151 A1 | 9/2005 | Fang et al. |
| 2005/0216679 A1* | 9/2005 | Levy ............................ 711/162 |
| 2006/0021041 A1* | 1/2006 | Challener et al. ............... 726/24 |
| 2006/0143316 A1* | 6/2006 | Mills et al. ....................... 710/5 |
| 2006/0143713 A1 | 6/2006 | Challener et al. |
| 2006/0195904 A1* | 8/2006 | Williams ....................... 726/24 |
| 2006/0236398 A1 | 10/2006 | Trakic et al. |
| 2006/0242686 A1 | 10/2006 | Toda et al. |
| 2008/0082824 A1* | 4/2008 | Ibrahim et al. ................ 713/171 |
| 2009/0222923 A1 | 9/2009 | Dixon |

* cited by examiner

SYSTEM AND METHOD TO PROTECT COMPUTING SYSTEMS

FIELD OF THE INVENTION

The invention relates to a system and method for protecting computing systems, and more particularly to a dedicated hardware component configured to communicate with a protection program.

BACKGROUND DESCRIPTION

Antivirus and other protection software (hereinafter referred generally to as "protection software") are designed to identify, thwart and eliminate computer viruses and other malicious software (malware) such as, for example, computer worms, Trojan horses and other malicious attacks on a computing system. As should be known, a computer virus can replicate itself and infect a computing system, and can spread to other computing systems by infecting files on a network file system or a file system that is accessed by another computer. Some viruses are programmed to damage programs, delete files, etc.; whereas, other viruses are designed to simply replicate themselves and make their presence known by presenting text, video, or audio messages.

In any event, protection software typically uses two techniques to identify, thwart and eliminate computer viruses and other malicious software (malware). These techniques include:

Examining (scanning) files to look for known viruses matching definitions in a virus dictionary; and
  Identifying suspicious behavior from any computer program which might indicate infection. Such analysis may include data captures, port monitoring and other methods.

Most protection software uses both of these approaches, with an emphasis on the virus dictionary approach.

Using the known techniques, the known protection software reduces computing performance by making considerable demands on resources. For example, in operation the known protection programs load to the operating system and, once loaded, begin the scan of the physical hardware and software. The known protection programs, though, scan 100% of the files, with all of the files being marked regardless of whether the files were previously accessed and/or updated. Although this provides 100% protection, it also uses a considerable amount of resources.

Moreover, known protection programs are tightly coupled into the existing operating system of the computing system. These programs are thus visible to the operation. In such situation, unbeknownst to the user or protection software, malicious scripts can be downloaded to "fool" the operating system into believing that a scan was performed when, in fact, the scan was not performed by the protection software. In these cases, the protection software will report a "pass" scan to the user, even though a scan was never performed.

Accordingly, there exists a need in the art to overcome the deficiencies and limitations described hereinabove.

SUMMARY OF THE INVENTION

In a first aspect of the invention, a subsystem comprises a dedicated hardware component configured to track modified locations of a hard drive and to provide a list of the modified locations to a protection program independent of an operating system. The modified locations are a subset of files of the hard drive.

In another aspect of the invention, a computer hardware subsystem comprises a memory comprising content. The content is at least a list of files which have been modified within a predetermined period of time. The list of files is a subset of files of a hard drive. A dedicated hardware component is configured to track the files which have been modified and provide a location of the files to the memory. A communication link between the dedicated hardware component and a protection program provides the protection program with the subset of files of the hard drive as referenced by the memory content.

In yet another aspect of the invention, a method comprises tracking files which have been updated and logging a location of the tracked files in a memory log. The method further includes retrieving the location of the tracked files from the memory log and providing the location to a protection program for scanning of the tracked files.

DETAILED DESCRIPTION OF EMBODIMENTS OF THE INVENTION

The invention relates to a system and method for protecting computing systems, and more particularly to a system and method comprising a dedicated hardware component configured to communicate with a protection program (e.g., anti virus application). In embodiments, the dedicated hardware component is configured to track modified locations of a hard disk drive(s) and store a list of the modified locations in a memory, e.g., non volatile random access memory (NVRAM). The dedicated hardware component provides the list of modified locations to the protection program by a secure communication link, via a communication protocol. From reset to shutdown, only the protection program can access the modified data from the dedicated hardware component, thereby providing a separate wall of operation independent of the operating system.

By implementing the system and method of the invention, an antivirus scan, for example, can be a subset of the total hard drive as referenced by NVRAM content, e.g., only the files on a list stored in memory. This saves considerable resources and considerably reduces scan times; compared to scanning each and every file, regardless of whether the file was previously accessed or updated. In embodiments, the list can be updated and deleted at predetermined times. For example, the list can be deleted after a successful scan.

In operation, the activities of the dedicated hardware component and the protection program are independent of the operating system of the computing system. This ensures that the protection program performs its intended functions, e.g., scans the files, regardless of whether the operating system is corrupted by a virus or other malicious attack. Thus, in implementation, the operating system is isolated from the scanning operations thus eliminating the known operating system risks. Additionally, as the operating system is isolated, it cannot write or change any information in the dedicated hardware component, thereby providing another level of protection.

Figure 1:
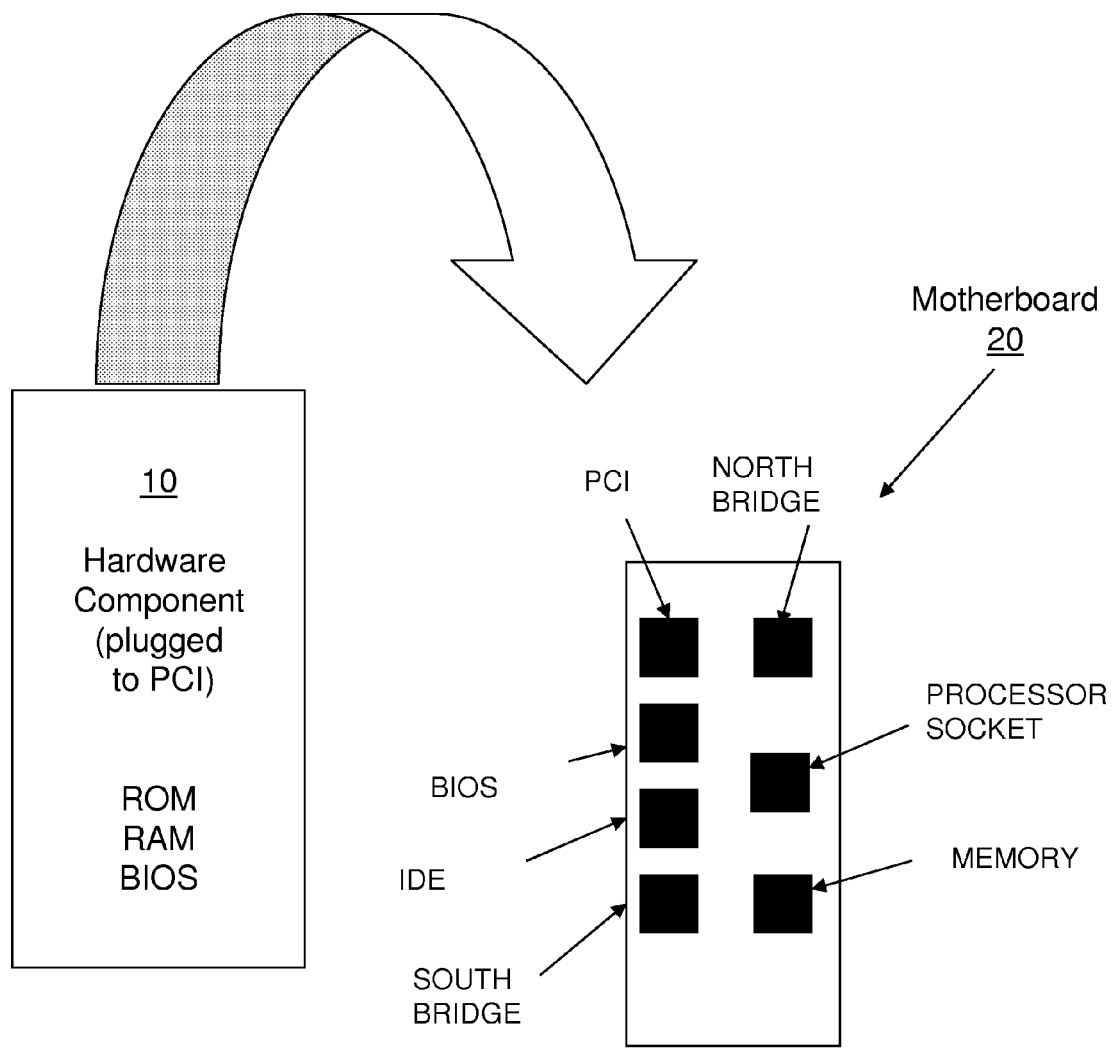
FIG. 1 is representative of a system implementing the invention.

FIG. 1 is representative of a system implementing the invention. In particular, a dedicated hardware component 10 of the invention is plugged into a conventional PCI (peripheral component interconnect) board 20. The dedicated hardware component 10 is a plug and play device, which interfaces with the conventional PCI board 20 and is easily integrated into most available platforms.

In embodiments, the dedicated hardware component 10 (also referred to as an IDE "Integrated Drive Electronics" controller) includes a ROM, RAM, processing unit and BIOS. The BIOS is configured to intercept the write application from the operating system to the hard drive, and maintain the files being accessed (updated) for future scanning. The system is also configured in such a manner that only the protection program can access the data on the ROM and RAM of the dedicated hardware component 10. In further embodiments, the protection program can only access the ROM and RAM via an encryption key. In this way, only the user which passes the encryption to the installed protection program can use the information on the dedicated hardware component 10.

Figure 2:
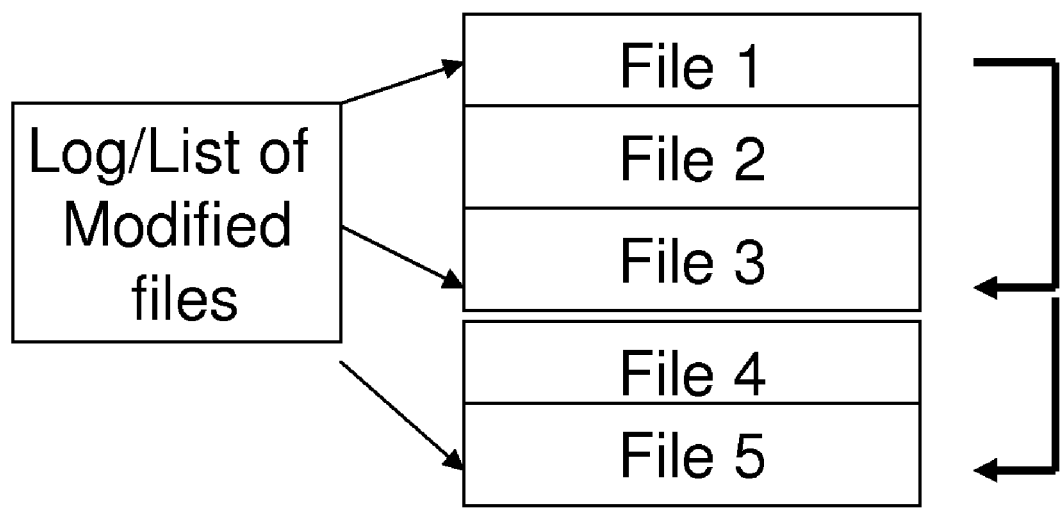
FIG. 2 shows an exemplary log in accordance with the invention.

As discussed above, the dedicated hardware component 10 maintains track of the physical drive locations of updated files from reset to shutdown. By doing so, the dedicated hardware component 10 can log specific information (location) related to the write operations of the updated files in the memory (e.g., NVRAM). It should be understood that the updated files are files which are potentially infected with a virus or malware. For example, FIG. 2 shows a log (list of files) which was updated during operations. This log includes potentially infected files. In the example of FIG. 2, the list includes file 1, file 3 and file 5, all of which had write operations performed thereon. After the files in the log are scanned, they can be deleted.

Moreover, for any hard drive writes and as an added layer of security, a CRC code can be stored in the memory (e.g., NVRAM) so that during the scan, the file can be confirmed to be the same file as was written earlier. As should be understood, a CRC (Cyclic Redundancy Check) is a type of hash function used to produce a checksum in order to detect errors in transmission or storage. The dedicated hardware component 10 is also configured for data journaling, i.e., writing old versions of the files to back up storage for later recovery.

Figure 3:
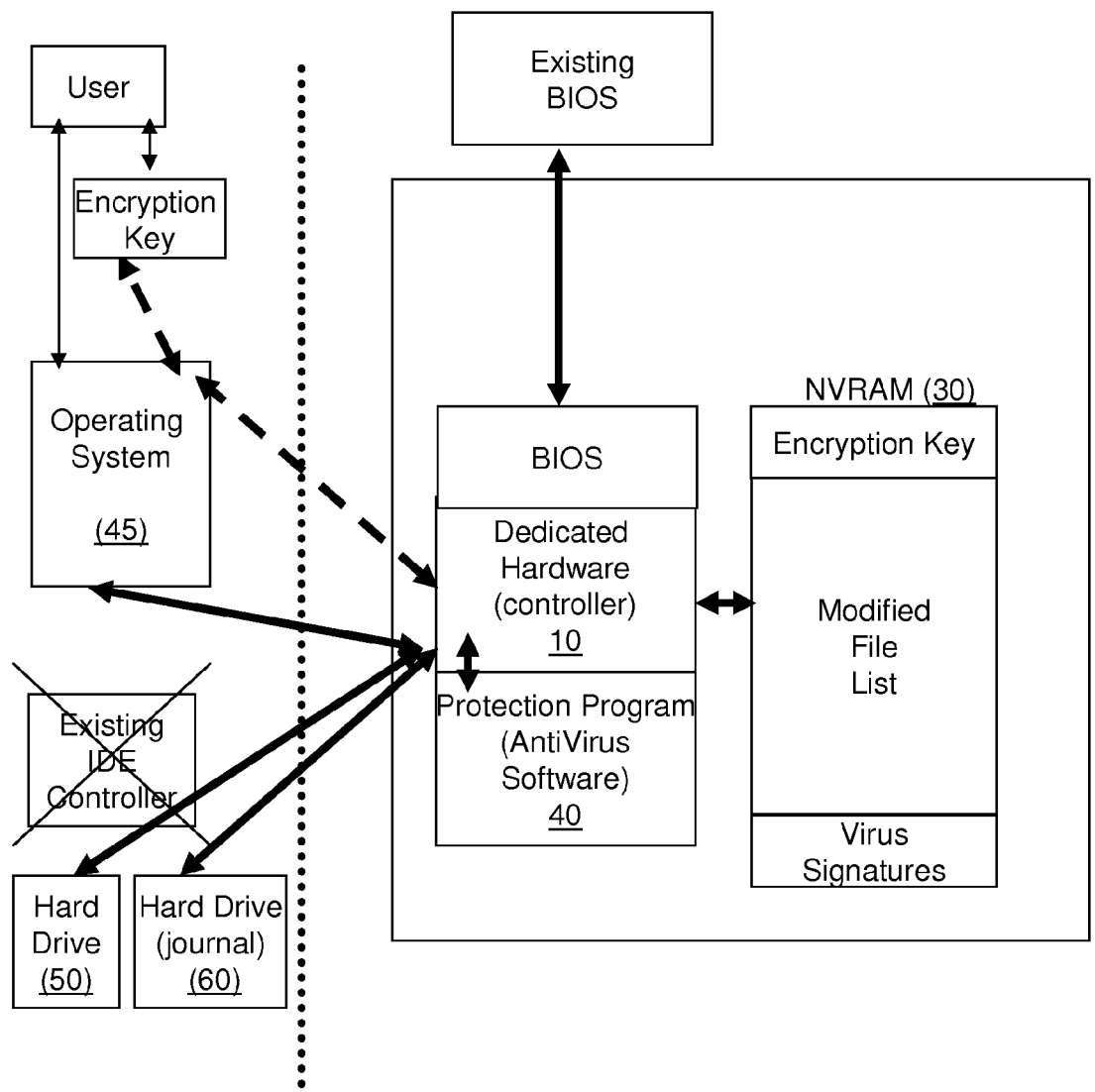
FIG. 3 shows an exemplary architecture in accordance with the invention.

FIG. 3 shows an exemplary architecture in accordance with the invention. In FIG. 3, the dedicated hardware component 10 communicates with the PCI board (not shown) via the existing BIOS. This can be accomplished through a script, which can be implemented by one of skill in the art and, as such, is not discussed further herein. The communication between the existing BIOS and the dedicated hardware component 10 allows for secure updating of the protection program 40, as well as updating of encryption keys and other security features contemplated by the invention. Thus, in embodiments, a private key can exist within the BIOS, and the public key can be on the protection program 40. For security reasons, the encryption key is stored in the memory 30. The memory 30 also stores the virus signatures, in one embodiment, as discussed in more detail below.

The dedicated hardware component 10 also replaces the existing IDE controller on the PCI board and, as such, will handle reading/writing operations to the hard drives 50 and 60. The hard drive 60 is configured to store (journal) files prior to scanning.

As discussed, the dedicated hardware component 10 also tracks the files that are accessed and/or updated in the hard drives 50 and writes these files to a log (list) in the memory 30. The memory 30 stores the list for later access by the dedicated hardware component 10. The dedicated hardware component 10 also communicates with the user through the operating system 45 via encryption. The user is also capable of communicating directly with the operating system 45 to gain access to files on the hard drive, during normal operations.

At scan time, e.g., at the request of the user, the protection program 40 will request the list from the dedicated hardware component 10 which, in turn, retrieves the list from the memory 30. In embodiments, the protection program 40 can communicate via encrypted communication with the dedicated hardware component 10. By allowing the protection program 40 to communicate directly with the dedicated hardware component 10, it is now possible to bypass the operating system 45 thus providing a more secure and robust system independent of the operating system 45. Accordingly, it is possible to reduce the dependency on the operating system, for the reasons already discussed herein.

In one specific implementation, at scan time the protection program 40 will query the dedicated hardware component 10, which communicates with the memory 30, to locate the first valid scan location on the hard drive 50. Once the first valid location is scanned, the protection program 40 will query the dedicated hardware component 10 for the next valid location, until all modified files have been scanned on the hard drive 50. By scanning only the valid files, it is possible to reduce resource consumption, amongst other features.

Thus, in embodiments, the dedicated hardware component 10 includes many embedded functions as already discussed. By way of non-limiting illustrative example, the dedicated hardware component 10 is configured to (i) read data from hard disk bus and determine file changes, (ii) record in the memory 30 the pointer to the changed file with date stamp information, (iii) encrypt communications intended for the protection program through the operating system, (iv) update the file list in the memory with information from the protection program, e.g., virus signatures, (v) communicate with the BIOS to receive delinquent file dates, and (vi) alert the user via the BIOS if the protection program has not cleared the file from memory 30 within a user specified timeframe.

Figure 4:
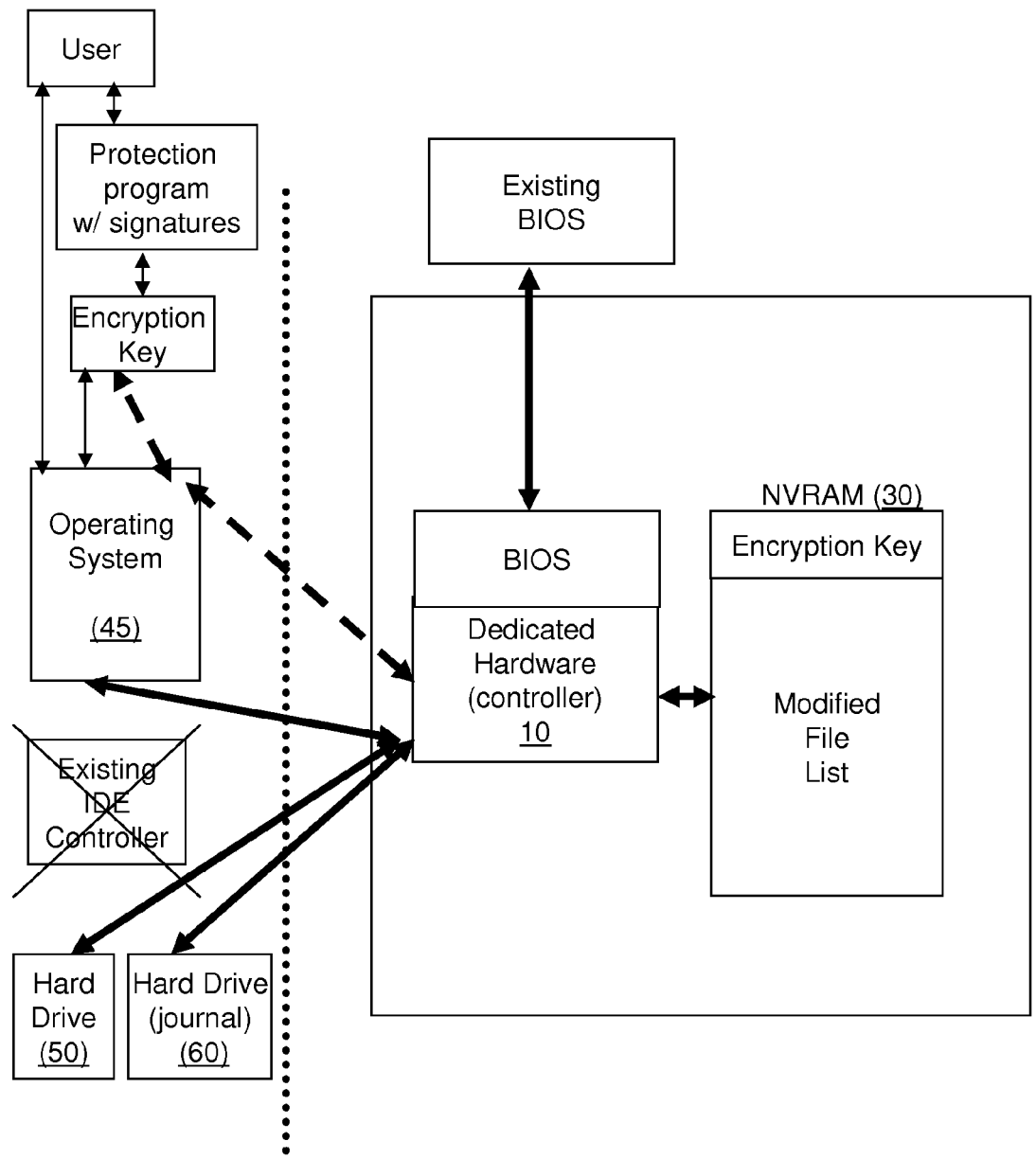
FIG. 4 shows another exemplary architecture in accordance with the invention.

FIG. 4 shows another exemplary architecture in accordance with the invention. In the implementation of FIG. 4, the protection program 40 is provided between the user and the encryption key. In this architecture, the signatures of the protection program 40 are resident on the protection program 40. In this embodiment, the dedicated hardware component 10 still (i) replaces the existing IDE controller on the PCI board and, as such, will handle reading/writing operations to the hard drives 50 and 60, (ii) tracks the files that are accessed and/or updated in the hard drive 50 and writes these files to a list in the memory 30 for later access by the dedicated hardware component 10, and (iii) communicates with the user and protection program 40 through the operating system 45 via encryption.

As with the previous embodiments, the dedicated hardware component 10 communicates with the PCI board (not shown) via the existing BIOS. As described, this can be accomplished through a script which allows such communication, directly, with the existing BIOS. The communication between the existing BIOS and the dedicated hardware component 10 allows for secure updating of encryption keys and other security features contemplated by the invention. The encryption key can still be stored in the memory 30.

In the implementation of FIG. 4, the protection program 40 will query the dedicated hardware component 10, via encryption, to locate the first valid scan location on the hard drive 50. Once the first valid location is scanned, the protection program 40 will query the dedicated hardware component 10 for the next valid location, until all modified files have been scanned on the hard drive 50. In this and other embodiments, the protection program 40 can hand off its responsibilities, e.g., scanning operations, to the dedicated hardware component 10.

FIGS. 5-8 show exemplary flow diagrams implementing processing steps in accordance with embodiments of the invention. FIGS. 5-8 may equally represent high-level block diagrams of the invention. The processes of FIGS. 5-8 may take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any system that can contain, store, communicate, propagate, or transport the program for use by or in connection with the instruction execution system, system, or device. The medium can be an electronic, magnetic, optical, electromagnetic, infrared, or semiconductor system (or system or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 5:
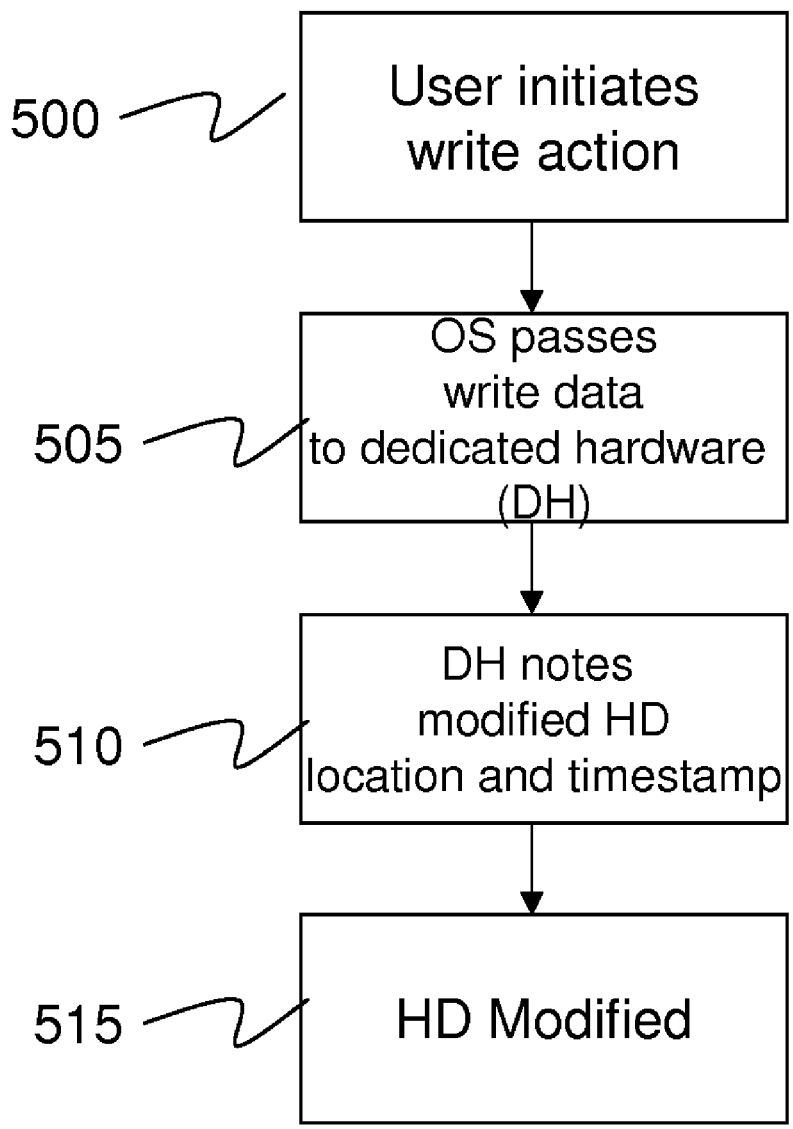
FIGS. 5-8 show exemplary flow diagrams implementing processing steps in accordance with embodiments of the invention.

FIG. 5 shows data write operations in a parallel mode, in accordance with the invention. At step 500, the user initiates a write action. At step 505, the operating system passes the write application to the dedicated hardware component. At step 510, the dedicated hardware component notes the modified hard drive location, timestamps such notification and provides this information to the memory for logging. At step 515, the hard drive is modified.

Figure 6:
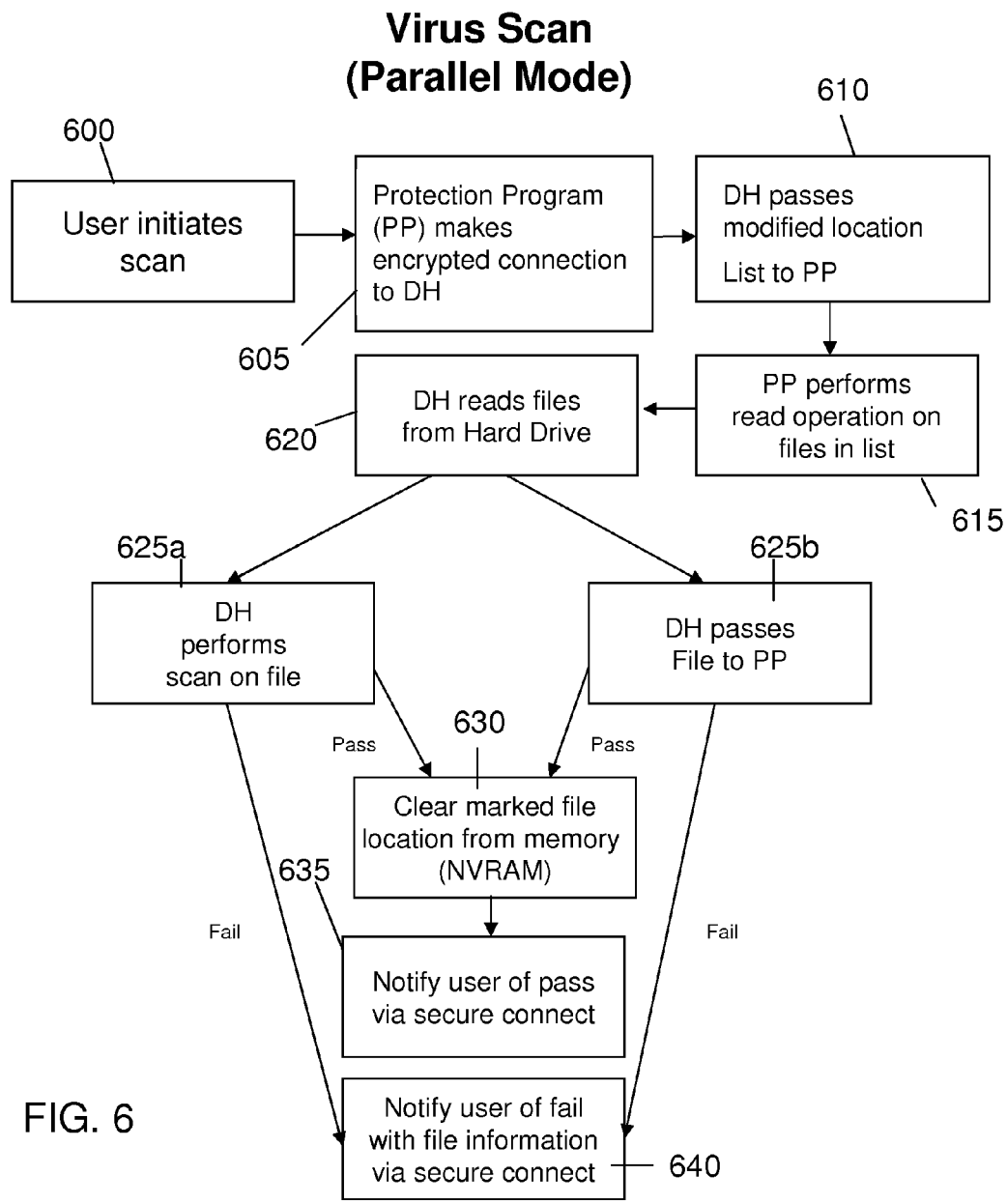

FIG. 6 shows a scan in parallel mode, in accordance with the invention. At step 600, the user initiates a scan. At step 605, the protection program connects to the dedicated hardware component via an encrypted connection. At step 610, the dedicated hardware component passes the modified location list to the protection program. More specifically, the dedicated hardware component provides the location of the modified files (files accessed and/or updated) to the protection program. At step 615, the protection program performs read operations on the files in the retrieved list. At step 620, the dedicated hardware component reads the files from the hard drive. Depending on the implementation, at step 625a, the dedicated hardware component will perform the scan on the files or, alternatively, at step 625b, the dedicated hardware component will pass the file to the protection program for scanning.

If the scan passes, at step 630, the memory will be cleared of the marked file and, at step 635, the user will be notified that the file has passed. This notification can be provided by a secure or encrypted connection. If the scan fails, the user will be notified of the failure with the file information, at step 640.

Again, this notification may be provided by a secure or encrypted connection.

Figure 7:
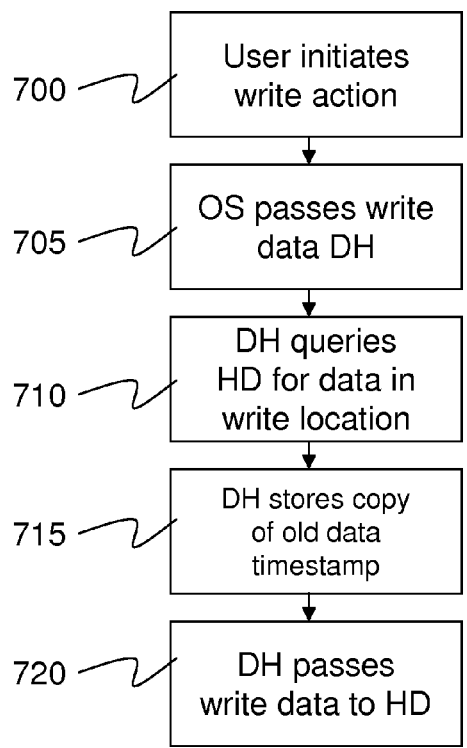

FIG. 7 shows data journaling in accordance with the invention. At step 700, the user initiates a write action. At step 705, the operating system passes the write operation to the dedicated hardware component. At step 710, the dedicated hardware component queries the hard drive for the data in the write location. At step 715, the dedicated hardware component stores a copy of the old data and timestamp thereof in an internal or external storage (e.g., hard drive 60). At step 720, the dedicated hardware component passes the write data to the hard drive.

Figure 8:
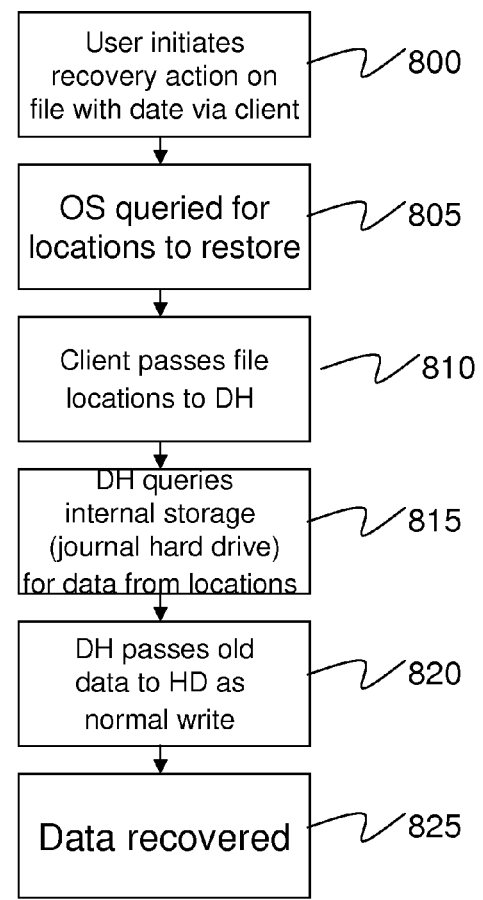

FIG. 8 shows a data recovery in serial mode, in accordance with the invention. At step 800, the user initiates a recover action on the file by providing date information to a client (e.g., third party server or service provider). The operating system is queried for the locations to restore, at step 805. At step 810, the client passes the file locations to the dedicated hardware component. At step 815, the dedicated hardware component queries the internal or external storage (location of the old data) from data for locations. At step 820, the dedicated hardware component passes the old data to the hard drive for normal write operations. At step 825, the data is considered recovered.

While the invention has been described in terms of exemplary embodiments, those skilled in the art will recognize that the invention can be practiced with modifications and in the spirit and scope of the appended claims.

What is claimed:

1. A subsystem comprising:
   a dedicated hardware component independent of an operating system, the dedicated hardware component configured to:
   track modified locations of a hard drive;
   provide a list of the modified locations to a protection program, which is independent of the operating system, such that the operating system is isolated from scanning operations of the protection program, wherein the modified locations are a subset of files of the hard drive;
   store a copy of old data for the modified locations before the modified locations are modified;
   communicate with existing BIOS of a computing system running the operating system to receive delinquent file dates; and
   alert a user if the protection program has not cleared a file from a memory within a specified timeframe.

2. The subsystem of claim 1, wherein the dedicated hardware component is further configured to provide the subset of files to the memory for storage and future retrieval, upon a request by the protection program.

3. The subsystem of claim 2, wherein the memory is non volatile memory configured to store encryption information and virus signatures.

4. The subsystem of claim 1, further comprising a secure link between the protection program and the dedicated hardware component.

5. The subsystem of claim 1, wherein the dedicated hardware component is a plug and play device.

6. The subsystem of claim 3, wherein the dedicated hardware component includes ROM, RAM, a processing unit and BIOS configured to intercept write operations from the operating system.

7. The subsystem of claim 1, wherein the dedicated hardware component maintains track of physical drive locations of the subset of files from reset to shutdown such that any updated files can be logged for future scanning.

8. The subsystem of claim 1, wherein the subset of files is infected files.

9. The subsystem of claim 1, further comprising a secure communication link between the existing BIOS and the dedicated hardware component configured to permit secure updating of the protection program and updating of encryption keys.

10. The subsystem of claim 1, wherein the dedicated hardware component is further configured to at least one of (i) read data from a hard disk bus and determine file changes, (ii) record in memory a pointer to a changed file with date stamp information, (iii) encrypt communications, and (iv) update a file list in the memory with information from the protection program.

11. A computer hardware subsystem, comprising:
 a memory comprising content, the content being at least a list of files which have been modified within a predetermined period of time, the list of files being a subset of files of a hard drive;
 a dedicated hardware component independent of an operating system configured to:
  track the files which have been modified and provide a location of the files to the memory;
  communicate with existing BIOS of a computing system running the operating system to receive delinquent file dates; and
  alert a user if a protection program has not cleared a file from the memory within a specified timeframe;
 a communication link between the dedicated hardware component and the protection program to provide the protection program the subset of files of the hard drive as referenced by the memory content, the protection program being independent of the operating system such that the operating system is isolated from scanning operations of the protection program,
 wherein the dedicated hardware component is configured to store a copy of old data for the files which have been modified before the files are modified.

12. The computer hardware subsystem of claim 11, wherein the memory is non volatile memory configured to store encryption information and virus signatures.

13. The computer hardware subsystem of claim 11, wherein the communication link is a secure link.

14. The computer hardware subsystem of claim 11, wherein the protection program is configured to access the memory via encryption.

15. The computer hardware subsystem of claim 11, wherein the dedicated hardware component includes ROM, RAM, a processing unit and BIOS, the BIOS being configured to intercept write operations from an operating system.

16. A method comprising:
 tracking files, which have been updated;
 storing a copy of old data for the files, which have been updated, before the files are updated;
 logging a location of the tracked files in a memory log;
 retrieving the location of the tracked files from the memory log and providing the location to a protection program for scanning of the tracked files;
 communicating with existing BIOS of a computing system running an operating system to receive delinquent file dates; and
 alerting a user if the protection program has not cleared a file from the memory within a specified timeframe,
 wherein the protection program runs scanning operations independent and isolated from the operating system.

17. The method of claim 16, further comprising marking each of the tracked files which have been successfully scanned and clearing the marked files from the memory log.

18. The method of claim 16, further comprising one of:
 notifying the user of a successful scan of the tracked files; and
 notifying the user of an unsuccessful scan of the tracked files.

19. The method of claim 16, further comprising storing the tracked files prior to scanning.

20. The method of claim 19, further comprising time stamping the stored tracked files.

21. A subsystem comprising:
 a dedicated hardware component independent of an operating system, the dedicated hardware component is configured to:
  track modified locations of a hard drive;
  provide a list of the modified locations to a protection program, which is independent of the operating system, such that the operating system is isolated from scanning operations of the protection program, the modified locations being a subset of files of the hard drive;
  store a copy of old data for the modified locations before the modified locations are modified;
  determine file changes based on the modified locations being the subset of files of the hard drive;
  record in a non volatile memory a pointer to a changed file with date stamp information;
  store the old data with date stamp information in the hard drive;
  encrypt communications;
  update a file list in the non volatile memory with information from the protection program;
  communicate with existing BIOS of a computing system running the operating system to receive delinquent file dates,
  alert a user if the protection program has not cleared a file from memory within a specified timeframe; and
  clear the non volatile memory of any changed file that has passed scanning operations and notify the user that the changed file passed,
 wherein:
  the dedicated hardware component is further configured to provide the subset of files to the memory for storage and future retrieval, upon a request by the protection program;
  the memory is non volatile memory configured to store encryption information and virus signatures;
  the dedicated hardware component includes ROM, RAM, a processing unit and BIOS configured to intercept write operations from the operating system;
  the RAM includes a cyclic redundancy check used to produce a checksum to detect errors in transmission or storage;
  the BIOS of the dedicated hardware component is configured to communicate with the existing BIOS of the computing system running the operating system; and
  the protection program directly communicates with the dedicated hardware component, bypassing the operating system, to request a list of files that were at least one of accessed and updated in the hard drive subsequent to a last scanning operation.

22. The computer hardware subsystem of claim 15, wherein: the dedicated hardware component is further configured to clear memory of any marked file that has passed scanning operations and notify a user that the file passed;

the RAM includes a cyclic redundancy check used to produce a checksum to detect errors in transmission or storage;

the BIOS of the dedicated hardware component is configured to communicate with the existing BIOS of the computing system running the operating system;

the protection program directly communicates with the dedicated hardware component, bypassing the operating system, to request a list of files that were at least one of accessed and updated in the hard drive subsequent to a last scanning operation.

23. The subsystem of claim 21, wherein for any write application from the operating system to a file on the hard drive the CRC is configured such that during a scan the file can be confirmed to be a same file as written previous to performing the write application.

24. The subsystem of claim 23, wherein the operating system passes the write application to the dedicated hardware component and the dedicated hardware component performs the write application by performing the reading and writing operations on a file of the hard drive.

25. The subsystem of claim 24, wherein the dedicated hardware component replaces an existing integrated drive electronics (IDE) controller that conventionally handles the reading and writing operations to the hard drive.

* * * * *